Patented Dec. 21, 1937

2,102,957

UNITED STATES PATENT OFFICE 2,102,957

ASPHALT SOLUTION

Felix Kaufler and Hilger Peter Schmitz, Munich, Germany, assignors to Dr. Alexander Wacker Gesellschaft für Electrochemische Industrie, G. m. b. H., Munich, Germany, a corporation of Germany No Drawing. Application November 22, 1933, Serial No. 699,134. In Germany December 9, 1932

2 Claims. (Cl. 134—1)

This invention relates to an improved natural asphalt solution. In the art, asphalt solutions are known in which the volatile constituents consist entirely, or to a considerable extent, of benzol, or benzol derivatives, and are used for various purposes. An objection to such solutions is that their vapors are poisonous and if it be attempted to avoid this objection by the use of benzine, whose vapors are not poisonous, the solvent effect is unsatisfactory.

We have found that improved natural asphalt solutions can be obtained through the use of paraffin-hydrocarbons boiling between 50 and 200° C. as the essential volatile constituent in conjunction with limited quantities of volatile hydroxyl- or keto-group bearing compounds which alone do not completely dissolve natural asphalt. As such are adapted, for example, diacetone-alcohol, butyleneglycol-$\beta$-ethylether, acetophenone, etc.

While it is known that certain types of asphalts are soluble in hydrocarbons such as gasoline, there are other grades of asphalt of the same or different types which are not completely soluble in such hydrocarbons. It is the purpose of this invention to treat such asphalts so as to make a complete solution thereof. This result is obtained by making a solution of the asphalt in a solvent consisting of the hydrocarbon and a small proportion of an organic compound of the type referred to above. Although neither the hydrocarbon nor the organic compound by itself is capable of completely dissolving the asphalt, the mixture of the two does effect such a solution. This may be because certain of the ingredients are soluble in the hydrocarbon whereas other ingredients are soluble in the organic compound. In any event a complete solution is effected when both materials are present.

Example I 40 parts by weight of Gilsonite asphalt are dissolved in 60 parts by weight of a volatile solvent which consists of 96% paraffin-hydrocarbons boiling between 50 and 200° C. and 4% diacetone alcohol, with complete and stable solution of the asphalt and excellent spreading, adhesive and waterproof qualities.

Example II

Similar results are obtained by dissolving Syrian asphalt in a solvent consisting of

| | Parts by weight |
|---|---|
| 1. Paraffin-hydrocarbons | 94 |
| Butylenglycol-$\beta$-ethylether | 6 |
| 2. Paraffin-hydrocarbons | 96 |
| Diacetone-alcohol | 4 |
| 3. Paraffin-hydrocarbons | 93 |
| Butyl-alcohol | 4 |
| Acetone | 3 |
| 4. Paraffin-hydrocarbons | 94 |
| Glycolic acid butylester | 5 |
| Spirit abs. | 1 |
| 5. Paraffin-hydrocarbons | 94 |
| Lactic acid ethylester | 4 |
| Acetone | 2 |
| 6. Paraffin-hydrocarbons | 95 |
| Ethyl-propyl-ketone | 5 |
| 7. Paraffin-hydrocarbons | 94 |
| Butanol | 4 |
| Diacetone-alcohol | 2 |
| 8. Paraffin-hydrocarbons | 95 |
| Acetone | 4 |
| Benzene | 1 |
| 9. Paraffin-hydrocarbons | 95 |
| Acetophenone | 5 |
| 10. Paraffin-hydrocarbons | 94 |
| Cyclohexanone | 6 |

The specific proportions of paraffin hydrocarbons compound given herein have been found satisfactory in use, but we do not limit ourselves to such proportions, as the percentage of paraffin-hydrocarbons boiling between 50 and 200° and the percentage of volatile limited quantities of compound which alone do not dissolve asphalt from 0.5% to 10%. Also, we do not limit ourselves to the specific volatile compounds mentioned herein, as various other alcohols, esterified or etherified glycols, etc., can be used without departing from the scope of the invention.

Solutions so made can have the usual additions of pigments, fillers, resins, drying oils, and the like, and thereby better or more widely usable solutions can be obtained.

Solutions of asphalt according to this invention can be used for coating objects with asphalt or for the impregnation and binding of fibrous, powdery or granular materials.

We claim:

1. A complete and stable asphalt solution comprising about 40% of an asphalt of the class consisting of Gilsonite and Syrian asphalt and about 60% of a solvent, said solvent comprising at least 90% of a paraffin hydrocarbon boiling between 50° C. and 200° C. and, for increasing the solvent action of the paraffin hydrocarbon on the asphalt, less than 10% of an organic compound having a hydroxyl or ketone group of the class consisting of diacetone-alcohol, butylenglycol-$\beta$-ethylether, butyl alcohol, glycolic acid butylester, lactic acid ethylester, ethyl-propyl-ketone, acetone, acetophenone and cyclohexanone.

2. A complete and stable asphalt solution comprising an asphalt of the class consisting of Gilsonite and Syrian asphalt and a solvent, said solution having a consistency suitable for a coating composition, said solvent comprising at least 90% of a paraffin hydrocarbon boiling between 50° C. and 200° C. and, for increasing the solvent action of the paraffin hydrocarbon on the asphalt, less than 10% of an organic compound having a hydroxyl or ketone group of the class consisting of diacetone-alcohol, butylenglycol-$\beta$-ethylether, butyl alcohol, glycolic acid butylester, lactic acid ethylester, ethyl-propyl-ketone, acetone, acetophenone and cyclohexanone.

FELIX KAUFLER.
HILGER PET. SCHMITZ.